(12) United States Patent
Suwa et al.

(10) Patent No.: US 8,613,460 B2
(45) Date of Patent: Dec. 24, 2013

(54) BUSH- AND BRACKET-INTEGRATED STABILIZER BAR

(71) Applicant: NHK Spring Co., Ltd., Yokohama (JP)

(72) Inventors: Taisuke Suwa, Yokohama (JP); Yutaka Natsume, Yokohama (JP); Koichi Kusakawa, Yokohama (JP)

(73) Assignee: NHK Spring Co., Ltd., Tokyo (JP)

( * ) Notice: Subject to any disclaimer, the term of this patent is extended or adjusted under 35 U.S.C. 154(b) by 0 days.

(21) Appl. No.: 13/911,934

(22) Filed: Jun. 6, 2013

(65) Prior Publication Data

US 2013/0270787 A1 Oct. 17, 2013

Related U.S. Application Data

(63) Continuation of application No. PCT/JP2011/078297, filed on Dec. 7, 2011.

(30) Foreign Application Priority Data

Dec. 7, 2010 (JP) ................................. 2010-272759

(51) Int. Cl.
*B60G 21/055* (2006.01)
*F16F 1/16* (2006.01)

(52) U.S. Cl.
USPC ...... 280/124.107; 280/124.166; 280/124.152; 267/276; 28/896.91; 28/897.2

(58) Field of Classification Search
USPC ............. 280/124.152, 5.511, 5.506, 124.106, 280/124.107, 124.149, 124.137, 124.166, 280/FOR. 115, FOR. 116, FOR. 146, 280/FOR. 152, FOR. 178; 267/276; 29/896.91, 897.2
See application file for complete search history.

(56) References Cited

U.S. PATENT DOCUMENTS 5,588,209 A * 12/1996 Fisher et al. ................. 29/897.2
8,419,033 B2 * 4/2013 Kuroda .................. 280/124.164
(Continued)

FOREIGN PATENT DOCUMENTS

| JP | 9-295372 A | 11/1997 |
|---|---|---|
| JP | 10-184788 A | 7/1998 |

(Continued)

OTHER PUBLICATIONS

English translation of International Preliminary Report on Patentability (IPRP) including Written Opinion mailed Jun. 20, 2013 in parent International Application No. PCT/JP2011/078297.

(Continued)

*Primary Examiner* — Keith Frisby
(74) *Attorney, Agent, or Firm* — Holtz, Holtz, Goodman & Chick, PC

(57) ABSTRACT

A bush- and bracket-integrated stabilizer bar includes a stabilizer bar, a rubber bush attached to an outer periphery of the stabilizer bar, and a bracket configured to mount the stabilizer bar to a bottom of a vehicle body with the rubber bush intervened. The stabilizer bar has amine-based curable epoxy paint or amine-containing cationic paint and a surface treatment layer containing a halogen donor-based surface treatment agent on the paint. The rubber bush has a surface treatment layer containing a halogen donor-based surface treatment agent on an inner surface thereof. A thermosetting epoxy adhesive layer containing an amine-based or an organic hydrazide-based curing agent and a bisphenol type epoxy resin is formed between the stabilizer bar and the rubber bush.

6 Claims, 4 Drawing Sheets

(56) References Cited

U.S. PATENT DOCUMENTS

| | | |
|---|---|---|
| 2004/0070161 A1 | 4/2004 | Fader |
| 2006/0091595 A1 | 5/2006 | Hayashi et al. |
| 2008/0106056 A1* | 5/2008 | Kleckner ............... 280/124.107 |
| 2010/0244395 A1* | 9/2010 | Sugiura et al. ......... 280/124.107 |

FOREIGN PATENT DOCUMENTS

| | | |
|---|---|---|
| JP | 11-108096 A | 4/1999 |
| JP | 2001-270315 A | 10/2001 |
| JP | 2002-69389 A | 3/2002 |
| JP | 2005-319850 A | 11/2005 |
| JP | 3716750 B2 | 11/2005 |
| JP | 2006-8082 A | 1/2006 |
| JP | 2006-027311 A | 2/2006 |
| JP | 2006-123818 A | 5/2006 |
| JP | 2006-170293 A | 6/2006 |
| JP | 2010-208528 A | 9/2010 |

OTHER PUBLICATIONS

International Search Report (ISR) dated Mar. 6, 2012 (and English translation thereof) issued in parent International Application No. PCT/JP2011/078297.

* cited by examiner

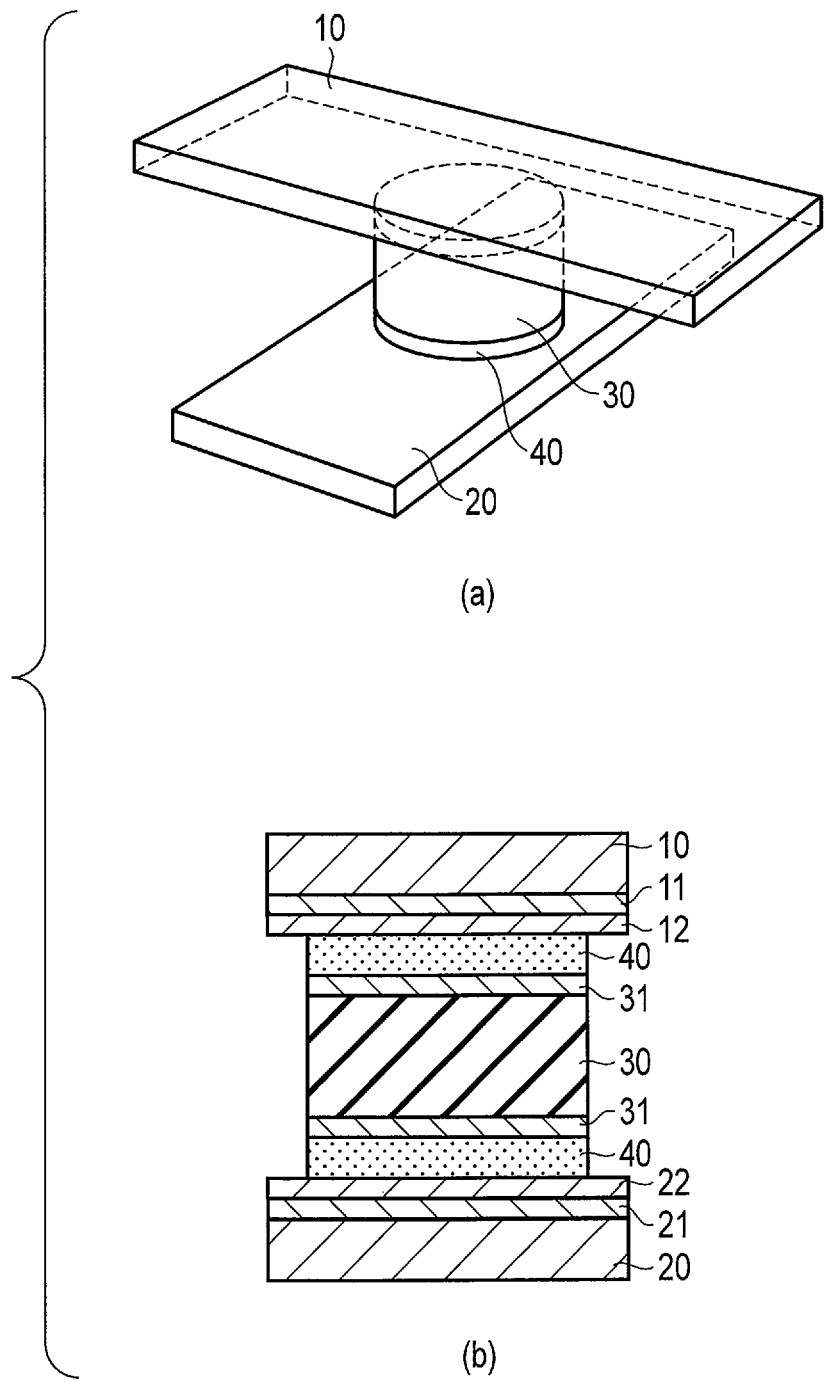
F I G. 2

BUSH- AND BRACKET-INTEGRATED STABILIZER BAR

CROSS-REFERENCE TO RELATED APPLICATIONS

This application is a Continuation Application of PCT Application No. PCT/JP2011/078297, filed Dec. 7, 2011 and based upon and claiming the benefit of priority from prior Japanese Patent Application No. 2010-272759, filed Dec. 7, 2010, the entire contents of all of which are incorporated herein by reference.

BACKGROUND OF THE INVENTION

1. Field of the Invention

The present invention relates to a bush- and bracket-integrated stabilizer bar in which a stabilizer bar, a portion of a suspension device for a vehicle such as an automobile, is integrated with a rubber bush and a bracket for mounting the stabilizer bar to the vehicle.

2. Description of the Related Art

A stabilizer bar is a member which mainly controls rolling, i.e., rolling movement around the longitudinal axis of a vehicle body. A rubber bush is attached between the stabilizer bar and the vehicle body, and it reduces the propagation of vibration entering the stabilizer bar depending on the conditions of road surface to the vehicle body, and at the same time it flexibly follows-up the movement of the stabilizer bar and supports the vehicle body.

Force is exerted on the rubber bush attached to the stabilizer bar in the direction of rolling of the stabilizer bar depending on the vertical movement of the wheels or the vehicle body. Concurrently, force is exerted on the rubber bush in the vertical direction due to supporting the vehicle body and due to vibration.

The mainstream of a conventional stabilizer bar with a rubber bush has been of a non-bonded type where the stabilizer bar and the rubber bush, and the rubber bush and the bracket are not bonded to each other. Consequently, when water intrudes into the non-bonded portion or when ambient temperature is extremely low, for example, at −30° C., the problem of generating a strange sound due to stick-slip arises.

FIG. 6 shows generated torque (output) with respect to displacement of the stabilizer bar (input such as a kink in the stabilizer bar) when stick-slip occurs to a stabilizer bar with a rubber bush of a non-bonded type. As shown in FIG. 6, a phase shift develops between the displacement of the stabilizer bar and the torque, so that handling performance is affected and steering stability is impaired.

Further, since the stabilizer bar and the rubber bush, and the rubber bush and the bracket are not integrated by bonding, clearances develop between them when a large force is applied to the stabilizer bar. When hard foreign substances intruded into such clearances, there were cases where the stabilizer bar and the bracket were marred and a strange sound generated. Moreover, when hard foreign substances such as sand and stone were left in the clearances, there were cases where malfunctions such as abrasion and breaking occurred.

In order to cope with such problems, various measures by bonding have been conventionally taken. However, they have problems of producing insufficient effects, carrying high costs and others.

(1) Vulcanization Bonding Method (Examined Patent Publication No. 3716750 and Unexamined Patent Publication No. 2006-123818)

Examined Patent Publication No. 3716750 discloses a technology of placing a stabilizer bar and brackets in a mold and performing bonding concurrently with vulcanization molding of rubber bushes. However, since the stabilizer bar and the brackets made of metals are placed in the mold, strength and precision are required for the mold, besides durability of the mold degrades. Moreover, the stabilizer bar usually has a length of about one meter, and thus equipment including the mold and others is made larger and raise the problem of carrying a large cost. Further, paint is usually applied to the stabilizer bar and others after vulcanization bonding is performed, and thus coating defects are likely to develop, for example, between the rubber bush and the stabilizer bar, and incur loss of reliability. In addition, powder painting or cationic painting usually used in painting the stabilizer bar requires a drying or curing process involving high temperature and a long time period, and thus the problem of causing the possibility of heat deterioration of the vulcanization bonded rubber bush arises.

On the other hand, in Unexamined Patent Publication No. 2006-123818, the problems of the upsizing of equipment and others are avoided by performing vulcanization bonding on the brackets when vulcanization molding of the rubber bushes are performed, followed by bonding the rubber bushes with brackets vulcanization bonded thereto to the coated stabilizer bar using a chlorinated rubber based adhesive. However, the present inventors performed a trial manufacture based on the disclosed information and confirmed that heat treatment was necessary to bond the rubber bushes and the stabilizer bar using a chlorinated rubber based adhesive, and that the strength of the rubber bushes degraded by 40 to 50% by heat deterioration. Further, this method requires two sets of a bracket with a rubber bush on the upper and lower sides of a stabilizer bar, and thus it is hard to say that is advantageous from a cost standpoint.

(2) Post Bonding Method 1 (Unexamined Patent Publication No. 2005-319850)

Unexamined Patent Publication No. 2005-319850 discloses a method of performing vulcanization molding on vulcanized rubber as a measure for suppressing the cost rise by the method described in (1). By using the vulcanized rubber, this method resolves the drawbacks such as increased cost through the upsizing of equipment described in (1). However, the present inventors performed a trial manufacture under the same conditions (heating under 10% compression, at 160° C., and for 60 minutes) based on details disclosed therein, and confirmed a significant degradation in strength of rubber bush due to heat deterioration and a problem was raised as to the long-term reliability of the rubber bush. Further, in Unexamined Patent Publication No. 2005-319850, the bush and the bracket are not bonded or fixed together, and thus the problem of generating a strange sound in this portion or the problem of abrasion and breaking caused by intrusion of foreign substances cannot be resolved.

(3) Post Bonding Method 2 (Unexamined Patent Publication No. 2001-270315, Unexamined Patent Publication No. 2006-008082, and Unexamined Patent Publication No. 2006-027311)

Unexamined Patent Publication No. 2001-270315 discloses a method of using a thermosetting adhesive. This method involves curing the adhesive by applying high temperature painting treatment (at 130 to 200° C. for 20 minutes) in a painting step. However, this method also cannot prevent the heat deterioration caused by exposing the vulcanized rubber bush to a high temperature for a long time period. Further, this method also bonds the stabilizer bar and the bush alone and does not bond the bush and the bracket, and thus cannot prevent the strange sound from generating or abrasion and breaking caused by intrusion of foreign substances into this portion. Moreover, painting is performed after the rubber bush is bonded to the uncoated stabilizer bar, and thus painting defects such as leaving portions uncoated are likely to develop at the boundaries of the stabilizer bar and the rubber bush, and corrosion may develop from the painting defect portions, which may raise the problem of, for example, the stabilizer bar getting broken after use for a long time period.

On the other hand, Unexamined Patent Publication No. 2006-008082 and Unexamined Patent Publication No. 2006-027311 disclose methods for bonding a rubber bush by painting a thermosetting adhesive on a stabilizer bar which has been subjected to electrostatic painting or powder painting. However, as a result of performing a trial manufacture based on the details described in these documents, it is found that rubber breaking will not occur, since the adhesion force between the adhesive and the stabilizer bar or between the adhesive and the rubber bush is poor in these methods. Further, in these methods, the bush and the bracket are merely fixed by compression and are not bonded with each other, thus the problem of generating a strange sound in this portion or the problem of abrasion and breaking caused by intrusion of foreign substances still remains unresolved.

(4) Post Bonding Method 3 (Unexamined Patent Publication No. H11-108096)

Unexamined Patent Publication No. H11-108096 discloses a method for bonding chlorination treated rubber bush to a coated stabilizer bar with a thermosetting adhesive. This method is considered to improve the adhesion force of the rubber bush by performing chlorination treatment. However, as a result of performing a trial manufacture based on the disclosed information, it is confirmed that the rubber surface is roughened by the chlorination treatment and the adhesion force improved to a certain degree by anchor effect, but that the adhesive strength of the vulcanization bonding produced by the adhesive alone is by far insufficient for the rubber breaking to occur. Further, also in this method, the bush and the bracket are merely fixed with a clamp, thus the problem of generating a strange sound in this portion or the problem of abrasion and breaking caused by intrusion of foreign substances cannot be dealt with.

BRIEF SUMMARY OF THE INVENTION

An object of the present invention is to provide a bush- and bracket-integrated stabilizer bar, at a low price, which resolves the problems of generating a strange sound due to stick-slip phenomenon, generating a strange sound due to intrusion of foreign substances into clearances and breaking caused by abrasion, and concurrently has excellent steering stability.

According to an embodiment of the present invention, there is provided a bush- and bracket-integrated stabilizer bar comprising a stabilizer bar, a rubber bush attached to an outer periphery of the stabilizer bar, and a bracket configured to mount the stabilizer bar to a bottom of a vehicle body with the rubber bush intervened, wherein the stabilizer bar comprises an amine-based curable epoxy paint or an amine-containing cationic paint and a surface treatment layer containing a halogen donor-based surface treatment agent on the paint, in that the rubber bush comprises a surface treatment layer containing a halogen donor-based surface treatment agent on an inner surface thereof, and in that an adhesive layer containing an amine-based or an organic hydrazide-based curing agent and an epoxy resin is formed between the stabilizer bar and the rubber bush with each of the surface treatment layers thereof intervened.

In another embodiment of the present invention, it is further preferable that the bracket comprises an amine-based curable epoxy paint or an amine-containing cationic paint on an inner surface thereof and a surface treatment layer containing a halogen donor-based surface treatment agent on the paint, in that the rubber bush comprises a surface treatment layer containing a halogen donor-based surface treatment agent on an outer surface thereof, and in that an adhesive layer containing an amine-based or an organic hydrazide-based curing agent and an epoxy resin is formed between the bracket and the rubber bush with each of the surface treatment layers intervened.

According to the embodiment of the present invention, because the stabilizer bar and the rubber bush are firmly bonded and fixed, it is possible to provide a bush- and bracket-integrated stabilizer bar, at a low price, which resolves the problems of generating a strange sound due to stick-slip phenomenon, generating a strange sound due to intrusion of foreign substances into clearances and breaking caused by abrasion, and concurrently has excellent steering stability.

BRIEF DESCRIPTION OF THE SEVERAL VIEWS OF THE DRAWING

FIG. 2 is a perspective view (a) of a test piece produced in the Examples, and a cross-sectional view (b) of a test piece produced in the Examples;

DETAILED DESCRIPTION OF THE INVENTION

The bush- and bracket-integrated stabilizer bar according to embodiments of the present invention will be described in detail hereinafter.

Figure 1:
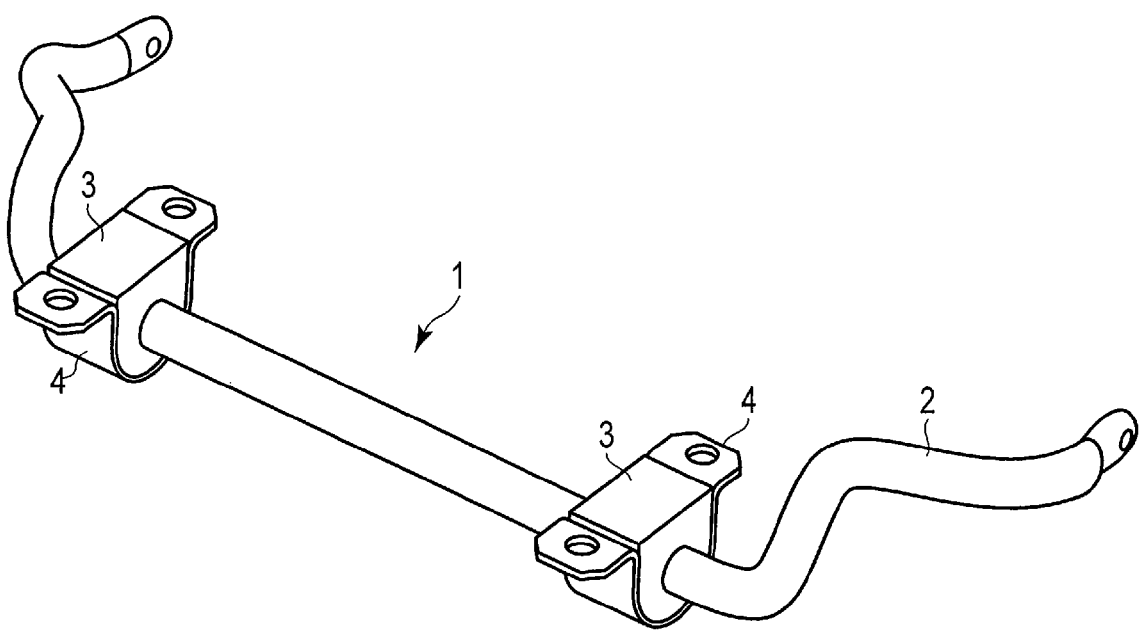
FIG. 1 is a perspective view of the bush- and bracket-integrated stabilizer bar according to an embodiment of the present invention.

FIG. 1 shows a perspective view of a bush- and bracket-integrated stabilizer bar 1 according to an embodiment of the present invention. The bush- and bracket-integrated stabilizer bar 1 comprises a stabilizer bar 2, two rubber bushes 3 each attached to the outer periphery of the stabilizer bar 2, and brackets 4 arranged on the outer periphery of the rubber bushes 3 and configured to mount the stabilizer bar 2 to the bottom of a vehicle body with the rubber bushes 3 intervened.

The stabilizer bar 2 comprises an amine-based curable epoxy paint or an amine-containing cationic paint (not shown in FIG. 1) on the surface thereof and a surface treatment layer (not shown in FIG. 1) containing a halogen donor-based surface treatment agent on the paint. Similarly, the bracket 4 preferably comprises an amine-based curable epoxy paint or an amine-containing cationic paint (not shown in FIG. 1) on the surface thereof and a surface treatment layer (not shown in FIG. 1) containing a halogen donor-based surface treatment agent on the paint. The rubber bush 3 comprises a surface treatment layer containing a halogen donor-based surface treatment agent at least on the inner surface (on the side of the stabilizer bar 2). Preferably, the rubber bush 3 also comprises a surface treatment layer containing a halogen donor-based surface treatment agent on the outer surface (on the side of the bracket 4).

An adhesive layer (not shown in FIG. 1) containing an amine-based or an organic hydrazide-based curing agent and an epoxy resin is formed between the stabilizer bar 2 and the rubber bush 3 with each of the surface treatment layers intervened. Preferably, an adhesive layer (not shown in FIG. 1) containing an amine-based or an organic hydrazide-based curing agent and an epoxy resin is also formed between the bracket 4 and the rubber bush 3 with each of the surface treatment layers intervened.

In the present invention, the amine-based curable epoxy paint or amine-containing cationic electrodeposition paint, which is generally used in painting automobiles, is used for painting the stabilizer bar and the brackets.

The amine-based curable epoxy paint, as is described in Unexamined Patent Publication No. H7-224234, includes bisphenol A type epoxy resin, bisphenol F type epoxy resin and novolak type epoxy resin. The curing agent includes solid amine or organic acid hydrazide. The solid amine includes 1,12-dodecanamine, 4,4'-diaminodiphenylmethane, 2,4-tolylenediamine, and the organic acid hydrazide includes succinic acid hydrazide, adipic acid hydrazide, sebacic acid hydrazide and isophthalic acid hydrazide.

The amine-containing cationic electrodeposition paint, as is described in Unexamined Patent Publication No. 2002-121491, includes a reaction product of polyepoxy resin and a cationization agent, one obtained by protonating a polycondensation product of polycarboxylic acid and polyamine with an acid, and one obtained by protonating a polyadduct product between a polyisocyanate compound and polyol and mono or polyamine with an acid, for example. The cationization agent includes amine compounds of primary amine, secondary amine, tertiary amine and polyamine, for example.

In the present invention, the surface treatment agent used for forming the surface treatment layer includes one obtained by dissolving a halogen-donor such as halogenated isocyanuric acid such as trichloroisocyanuric acid, dibromomethylhydantoin, and N-chloroparatoluenesulfonic acid amide in a solvent. In particular, trichloroisocyanuric acid is suitable, since it is easy to obtain and handle, and has a high improvement effect on the adhesive property. As the solvent for trichloroisocyanuric acid, ethyl acetate, methyl ethyl ketone, methyl acetate, and the like can be used. For example, in the Examples described hereinafter, a 5% trichloroisocyanuric acid solution in ethyl acetate is used as the surface treatment agent, but not limited thereto.

In the present invention, bisphenol F type epoxy resin and various curing agents for curing it as a two-component mixing type adhesive, for example, is used as the adhesive forming the adhesive layer. Strong adhesion force with the surface treatment layer can be obtained only when an amine-based curing agent or an organic hydrazide-based curing agent is used as the curing agent. The mixing ratio of the epoxy resin to each of the curing agents is optimum when the amount of reaction points of epoxy groups in the epoxy resin is equal to the amount of reaction points of the curing agent, but not limited thereto.

Further, in the present invention, when a roughening treatment of the rubber surface was performed, an abrasive paper with a grain size of P150 according to JIS R6010 was used. For performing the roughening treatment, a grain size in the range of P80 to P1200 can be used, and in particular, the range of P120 to P360 is preferable. Any means will do as long as the rubber surface can be physically roughened, and the means for performing the roughening treatment is not particularly limited to the abrasive paper.

In the following Examples, a test piece shown in FIG. 2 was produced for evaluation. FIG. 2 (a) is a perspective view of the test piece, and FIG. 2 (b) is a cross-sectional view of the test piece.

As a substitution for the stabilizer bar, the first steel member 10 was provided, and its surface was painted with amine-based curable epoxy paint 11. As a substitution for the bracket, the second steel member 20 was provided, and its surface was painted with amine-containing cationic electrodeposition paint 21. As a substitution for the rubber bush, a disk-shaped vulcanized natural rubber 30 having a diameter of 20 mm and a thickness of 5 mm was provided. The surface of the amine-based curable epoxy paint 11 on the first steel member 10, the surface of the amine-containing cationic electrodeposition paint 21 on the second steel member 20 and both the top and bottom surfaces of the natural rubber 30 were each treated with a 5% trichloroisocyanuric acid solution in ethyl acetate, thereby surface treatment layers 12, 22 and 31 were formed. The first steel member 10 and the natural rubber 30 were bonded with an epoxy adhesive with each of the surface treatment layers 12 and 31 intervened, thereby an adhesive layer 40 was formed. Similarly, the second steel member 20 and the natural rubber 30 were bonded with an epoxy adhesive with each of the surface treatment layers 22 and 31 intervened, thereby an adhesive layer 40 was formed.

Further, as comparative examples, test pieces not containing any of the constituent elements shown in FIG. 2 (b) was produced for evaluation.

The constitution of each of the examples and comparative examples are shown in Tables 1 and 2 described hereinafter.

For each of the test pieces, a tensile test was performed in the perpendicular direction to the plane of the disk-shaped natural rubber until the test piece was broken, and the strength at breaking and the breaking portion were examined.

As to combination of materials for test pieces that exhibited good evaluation results, samples were produced in which bush-shaped natural rubber was attached to a stabilizer bar and a bracket, and a torsion test was performed on each of the samples in the torsion direction of the stabilizer bar until the sample was broken, and the strength at breaking and a breaking portion were examined.

Further, as to combination of materials for test pieces that exhibited good evaluation results, in order to evaluate water resistant properties, bush-shaped samples were immersed in hot water at 80° C. for 120 hours, and then were taken out in the atmosphere, and then a torsion test was performed on each of the samples until the sample was broken similar to the above tests. The strength at breaking and the breaking portion were also examined.

Next, examples and comparative examples are specifically described.

EXAMPLE 1

The first steel member was provided and its surface was painted with amine-based curable epoxy paint. The second steel member was provided, and its surface was painted with amine-containing cationic electrodeposition paint. Further, a disk-shaped natural rubber with Shore hardness Hs of 60 was provided. Surfaces of these members were surface-treated with a 5% trichloroisocyanuric acid solution in ethyl acetate, thereby surface treatment layers were formed. Then, these surface treatment layers were bonded with a thermosetting epoxy adhesive containing 100 parts of EPICLON EXA835 (a trade name of a product of DIC Corporation) which is a bisphenol F type epoxy resin and 20 parts of FUJICURER FXR1000 (a trade name of a product of Fujikaseikogyo Inc.) as a curing agent, thereby adhesive layers were formed. Thus, a test piece shown in FIG. 2 was produced.

As a result of performing a tensile test on the test piece, the rubber was broken. The strength was 68 MPa. As a result of a torsion test for a trial-manufactured bush- and bracket-integrated stabilizer bar, the rubber was internally broken. The strength was 152 N·m.

Further, as a result of performing a torsion test after immersion in hot water, the rubber was broken in most of the adhesion region, and a portion of the adhesive was broken. The breaking of the adhesive was caused by deterioration. The adhesion strength at that time was 129 N·m.

EXAMPLE 2

Disk-shaped natural rubber with Shore hardness Hs of 85 was used. A test piece was produced with other conditions being the same as those in Example 1.

As a result of performing a tensile test on the test piece, the rubber was broken, and the strength was 84 MPa. As a result of a torsion test for a trial-manufactured bush- and bracket-integrated stabilizer bar, the rubber was broken, and the strength was 172 N·m.

Further, as a result of performing a torsion test after immersion in hot water, a portion of the rubber was internally broken, and in the remaining portion, the adhesive was broken in a range wider than the case of Example 1. The breaking of the adhesive was caused by deterioration, and the adhesion strength at that time was 136 N·m.

EXAMPLE 3

Disk-shaped natural rubber with Shore hardness Hs of 55 was used. A test piece was produced with other conditions being the same as those in Example 1.

As a result of performing a tensile test on the test piece, the rubber was broken, and the strength was 54 MPa. As a result of a torsion test for a trial-manufactured bush- and bracket-integrated stabilizer bar, the rubber was broken, and the strength was 172 N·m.

Further, as a result of performing a torsion test after immersion in hot water, the rubber was broken in most of the adhesion region, and the adhesive was broken in a very limited region. The breaking of the adhesive was caused by deterioration, and the adhesion strength at that time was 119 N·m.

EXAMPLE 4

A test piece was produced under the same conditions as those in Example 1 except that a curing agent of an epoxy adhesive was substituted with AMICURER PN23 (a product of Ajinomoto Corporation) which was an organic hydrazide-based curing agent. The mixing ratio was set to 100 parts of the epoxy resin and 30 parts of the curing agent.

As a result of performing a tensile test on the test piece, a rubber was broken, and the strength was 62 MPa. As a result of a torsion test for a trial-manufactured bush- and bracket-integrated stabilizer bar, the rubber was broken, and the strength was 172 N·m.

Further, as a result of performing a torsion test after immersion in hot water, the rubber was broken in most of the adhesion region, and a portion of the adhesive showed deterioration and was broken similar to the case of Example 1. The adhesion strength at that time was 127 N·m.

EXAMPLE 5

A test piece was produced under the same conditions as those in Example 1 except that an epoxy resin and a curing agent were substituted with Fosur 320/322 (a product of LORD Corporation) which was a commercially available epoxy-based adhesive. The curing agent was amine-based. The mixing ratio was set to 100 parts of the epoxy resin and 100 parts of the curing agent.

As a result of performing a tensile test on the test piece, a rubber was broken, and the strength was 69 MPa. As a result of a torsion test for a trial-manufactured bush- and bracket-integrated stabilizer bar, the rubber was broken, and the strength was 153 N·m.

Further, as a result of performing a torsion test after immersion in hot water, the rubber was broken in most of the adhesion region, and a portion of the adhesive was broken due to deterioration similar to the case of Example 1. The adhesion strength at that time was 125 N·m.

EXAMPLE 6

Prior to surface-treatment of the natural rubber, the surface of the adhesion portion was roughened with an abrasive paper with a grain size of P150 according to JIS R6010, and then surface-treatment was performed. A test piece was produced with other conditions being the same as those in Example 1.

As a result of performing a tensile test on the test piece, a rubber was broken, and the strength was 69 MPa. As a result of a torsion test for a trial-manufactured bush- and bracket-integrated stabilizer bar, the rubber was broken, and the strength was 154 N·m.

Further, as a result of performing a torsion test after immersion in hot water, degradation in the adhesion strength was not observed and the rubber was internally broken completely. The adhesion strength at that time was 152 N·m.

COMPARATIVE EXAMPLE 1

A test piece was produced without painting the first steel member and the second steel member (with an amine-based curable epoxy paint and an amine-containing cationic electrodeposition paint), and performing surface-treatment on the surfaces of the steel members with other conditions being the same as those in Example 1.

The test piece exhibited hardly any adhesion force, and the adhesive was detached from the surfaces of the steel members.

COMPARATIVE EXAMPLE 2

The surface of the first steel member was painted with amine-based curable epoxy paint, but surface treatment was not performed thereto. The surface of the second steel member was painted with amine-containing cationic electrodeposition paint, but surface treatment was not performed thereto. A test piece was produced with other conditions being the same as those in Example 1.

The test piece exhibited hardly any adhesion force, and detachment occurred on the surfaces of the steel members, more specifically at the interface between the surfaces of the steel members and the adhesive.

COMPARATIVE EXAMPLE 3

Surface treatment was not performed on disk-shaped natural rubber. A test piece was produced with other conditions being the same as those in Example 1.

The test piece exhibited hardly any adhesion force, and detachment occurred on the surfaces of the steel members, more specifically at the interface between the surfaces of the steel members and the adhesive.

COMPARATIVE EXAMPLE 4

A test piece was produced under the same conditions as those in Example 1 except that a curing agent of an epoxy adhesive was substituted with EPICLON B570 (a product of Hitachi Chemical Co., Ltd.), an acid anhydride-based curing agent, and that dimethylbenzylamine was used as a curing accelerator. The mixing ratio was set to 100 parts of an epoxy resin, 80 parts of the curing agent, and 0.8 parts of the curing accelerator.

As a result of performing a tensile test on the test piece, the rubber was broken, and the strength was 24 MPa. In the breaking cross-section, the surface of the steel member and the surface of the rubber were observed discontinuously in patches, and intermittent detachment occurred both at the interface between the steel member and the adhesive and at the interface between the rubber and the adhesive layer.

COMPARATIVE EXAMPLE 5

A test piece was produced under the same conditions as those in Example 1 except that a curing agent of an epoxy adhesive was substituted with EH317 (a product of ADEKA Corporation), a polymercaptan-based curing agent. The mixing ratio was set to 100 parts of an epoxy resin and 60 parts of the curing agent.

As a result of performing a tensile test on the test piece, detachment occurred both at the interface between the steel member and the adhesive layer and at the interface between the rubber and the adhesive, and the strength was 17 MPa.

COMPARATIVE EXAMPLE 6

A test piece was produced by performing vulcanization bonding on an unpainted steel member using unvulcanized natural rubber.

As a result of performing a tensile test on the test piece, a rubber was broken, and the strength was 65 MPa. As a result of a torsion test for a trial-manufactured bush- and bracket-integrated stabilizer bar, the rubber was internally broken, and the strength was 149 N·m.

Further, as a result of performing a torsion test after immersion in hot water, the rubber was internally broken, and degradation in the adhesion strength was not observed. The adhesion strength at that time was 146 N·m.

Incidentally, after performing the bonding step, epoxy powder painting was performed on a bush- and bracket-integrated stabilizer bar. As a result, small clearances developed between the rubber bush and the stabilizer bar and between the bracket and the rubber bush, unpainted portions were left behind, which clearly exhibited a high probability of causing durability deficiency.

Table 1 below provides a list of conditions and results for Examples 1 to 6 above, and Table 2 below provides a list of conditions and results for Comparative Examples 1 to 7 above. In Tables 1 and 2, open circles appearing in the upper rows indicate what treatment was performed, the arrows indicate that it is of the same value as the one in the left column. In Tables 1 and 2, marks appearing in the evaluation row have the following meanings: the open circle: Good, the open triangle: Acceptable, the cross: No good.

TABLE 1

| | | | | Examples | | | | | |
|---|---|---|---|---|---|---|---|---|---|
| | | | | 1 | 2 | 3 | 4 | 5 | 6 |
| Embodiment | Painting of steel member | Amine-based curable epoxy paint | | ○ | ○ | ○ | ○ | ○ | ○ |
| | | Amine-containing cationic electrodeposition paint | | | | | | | |
| | | Untreated (steel member as it is) | | | | | | | |
| | Steel member surface treatment | Trichloroisocyanuric acid treatment | | ○ | ○ | ○ | ○ | ○ | ○ |
| | Rubber side surface treatment | Trichloroisocyanuric acid treatment | | ○ | ○ | ○ | ○ | ○ | ○ |
| | | Rubber hardness | | 60 | 85 | 55 | 60 | 60 | 60 |
| | | Surface roughness | | Mirror surface | Mirror surface | Mirror surface | Mirror surface | Mirror surface | Roughened surface* |
| Epoxy resin | Bisphenol F type epoxy resin | EPICLON EXA835 | DIC Corporation | 100 | ← | ← | 100 | | 100 |
| Curing agent | Amine-based | FUKICURER FXR1000 | Fujikaseikogyo Inc. | 20 | ← | ← | | | 20 |
| | Organic hydrazide-based | ANICURER PN23 | Ajinomoto Corporation | | | | | 30 | |
| | Acid anhydride-based | EPICLON B570 | Hitachi Chemical Co., Ltd. | | | | | | |
| | Polymercaptan-based | EH317 | ADEKA Corporation | | | | | | |
| Curing accelerator | | Dimethylbenzylamine | Wako Pure Chemical Industries Ltd. | | | | | | |

TABLE 1-continued

|  |  |  |  | Examples | | | | | |
|---|---|---|---|---|---|---|---|---|---|
|  |  |  |  | 1 | 2 | 3 | 4 | 5 | 6 |
| Commercial product | Fosur320 | Epoxy adhesive | LORD Corporation |  |  |  |  | 100 |  |
|  | Fosur322 | Epoxy curing agent | LORD Corporation |  |  |  |  | 100 |  |
|  |  | Vulcanization bonding |  |  |  |  |  |  |  |
| Evaluation on test piece | Tensile test | Breaking strength |  | 68 | 84 | 54 | 62 | 69 | 69 |
|  |  | Breaking portion |  | Rubber broken | Rubber broken | Rubber broken | Rubber broken | Rubber broken | Rubber broken |
| Evaluation on bush-shaped sample | Torsion test | Breaking strength |  | 152 | 172 | 146 | 155 | 153 | 154 |
|  |  | Breaking portion |  | Rubber broken | Rubber broken | Rubber broken | Rubber broken | Rubber broken | Rubber broken |
|  | Evaluation |  |  |  |  |  |  |  |  |
| Evaluation on bush-shaped sample | Torsion test after immersion in hot water | Breaking strength |  | 129 | 136 | 119 | 127 | 125 | 152 |
|  |  | Breaking portion |  | Rubber broken partially | Portion of rubber broken partially | Rubber broken substantially | Rubber broken partially | Rubber broken partially | Rubber broken |
|  | Total evaluation |  |  | ○-Δ | Δ | ○ | ○-Δ | ○-Δ | ○ |

*Roughened surface: The surface is roughened using an abrasive paper with a grain size of P150 according to JIS R6010.

TABLE 2

|  |  |  |  | Comparative Examples | | | | | |
|---|---|---|---|---|---|---|---|---|---|
|  |  |  |  | 1 | 2 | 3 | 4 | 5 | 6 |
| Embodiment | Painting of steel member | Amine-based curable epoxy paint |  |  | ○ | ○ | ○ | ○ |  |
|  |  | Amine-containing cationic electrodeposition paint |  |  |  |  |  |  |  |
|  |  | Untreated (steel member as it is) |  | ○ |  |  |  |  | ○ |
|  | Steel member surface treatment | Trichloroisocyanuric acid treatment |  | ○ |  | ○ |  |  |  |
|  | Rubber side surface treatment | Trichloroisocyanuric acid treatment |  | ○ | ○ |  |  |  |  |
|  |  | Rubber hardness |  | 60 | 60 | 60 | 60 | 60 | 60 |
|  |  | Surface roughness |  | Mirror surface | Mirror surface | Mirror surface | Mirror surface | Mirror surface | — |
| Epoxy resin | Bisphenol F type epoxy resin | EPICLON EXA835 | DIC Corporation | 100 | ← | ← | 100 | 100 |  |
| Curing agent | Amine-based | FUKICURER FXR1000 | Fujikaseikogyo Inc. | 20 | ← | ← |  |  |  |
|  | Organic hydrazide-based | AMICURER PN23 | Ajinomoto Corporation |  |  |  |  |  |  |
|  | Acid anhydride-based | EPICLON B570 | Hitachi Chemical Co., Ltd. |  |  |  |  | 80 |  |
|  | Polymercaptan-based | EH317 | ADEKA Corporation |  |  |  | 60 |  |  |
| Curing accelerator | Dimethylbenzylamine |  | Wako Pure Chemical Industries Ltd. |  |  |  |  | 0.8 |  |
| Commercial product | Fosur320 | Epoxy adhesive | LORD Corporation |  |  |  |  |  |  |
|  | Fosur322 | Epoxy curing agent | LORD Corporation |  |  |  |  |  |  |
|  |  | Vulcanization bonding |  |  |  |  |  |  | ○ |
| Evaluation on bush-shaped sample | Tensile test | Breaking strength |  | <10 | <10 | <10 | 24 | 17 | 65 |
|  |  | Breaking portion |  | Interface detached | Interface detached | Interface detached | Interface detached | Interface detached | Rubber broken |
| Evaluation on bush-shaped sample | Torsion test | Breaking strength |  | — | — | — | — | — | 149 |
|  |  | Breaking portion |  | Interface detached | Interface detached | Interface detached | Interface detached | Interface detached | Rubber broken |
|  | Evaluation |  |  | X | X | X | X | X | ○ |
| Bush shape | Torsion test after immersion | Breaking strength |  | — | — | — | — | — | 146 |

TABLE 2-continued

| | | Comparative Examples | | | | | |
|---|---|---|---|---|---|---|---|
| | | 1 | 2 | 3 | 4 | 5 | 6 |
| in hot water | Breaking portion | — | — | — | — | — | Rubber broken |
| Total evaluation | | X | X | X | X | X | ○ |

Incidentally, breaking of a test piece at a breaking strength of around 60 MPa and at a torsion test strength of around 150 N·m means the breaking of rubber itself, and exhibits that the adhesion strength is higher than the strength of the rubber. From these results, in order to achieve sufficiently high adhesion strength, it is obvious that surface treatment of the steel member coated with amine-based curable epoxy paint or an amine-containing cationic electrodeposition paint be performed and bond the surface-treated natural rubber bush with an adhesive containing an amine-based curing agent or an organic hydrazide-based curing agent and an epoxy resin.

The reason why the combination stated above produces sufficient adhesion force is described below.

A halogen-donor such as halogenated isocyanuric acid, as a surface treatment agent, penetrates into a material having a double bond in the main chain such as natural rubber along with a solvent, and accesses the vicinity of the double bond in the main chain. Due to the action of water near the surface of the natural rubber, the halogenated isocyanuric acid is hydrolyzed to release halogen. The halogen attacks the nearby double bond in the main chain of the vulcanized rubber, which takes place addition reaction. During the course of the addition reaction, isolated isocyanuric acid is added along with chlorine to the main chain of the vulcanized rubber while keeping the ring structure.

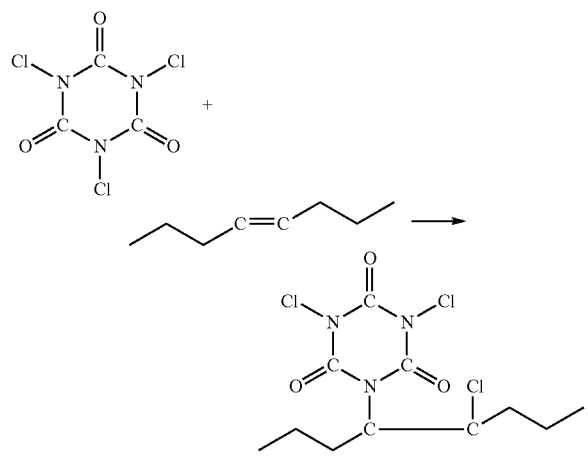

When addition of isocyanuric acid and chlorine to the surface of the vulcanized rubber, or reaction of isocyanuric acid with the paint and the adhesive is caused, it is known that a difference appears in infrared absorption spectrum between before and after the addition or reaction (Unexamined Japanese Patent Publication No. 2006-519894, and Unexamined Japanese Patent Publication No. 2009-131631).

Further, the halogen donor such as halogenated isocyanuric acid as the surface treatment agent is hydrolyzed due to the action of water near the surface of amine-based curable epoxy paint or amine-containing cationic electrodeposition paint to release halogen. This halogen, in particular chlorine, is considered to combine with hydrogen in R—NH$_2$ contained in the paint, or by other portions bonding therewith, and to undergo a reaction described below.

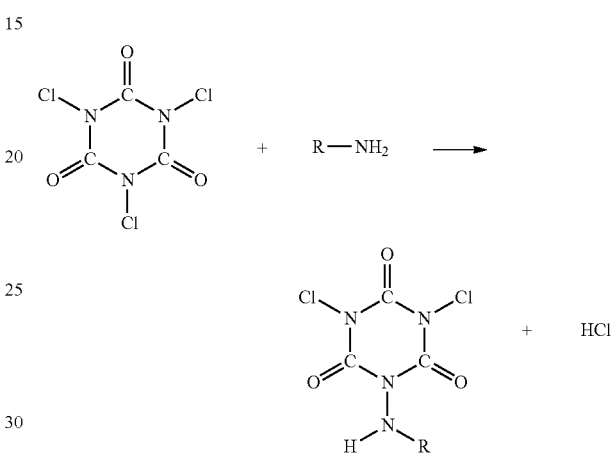

Figure 3:
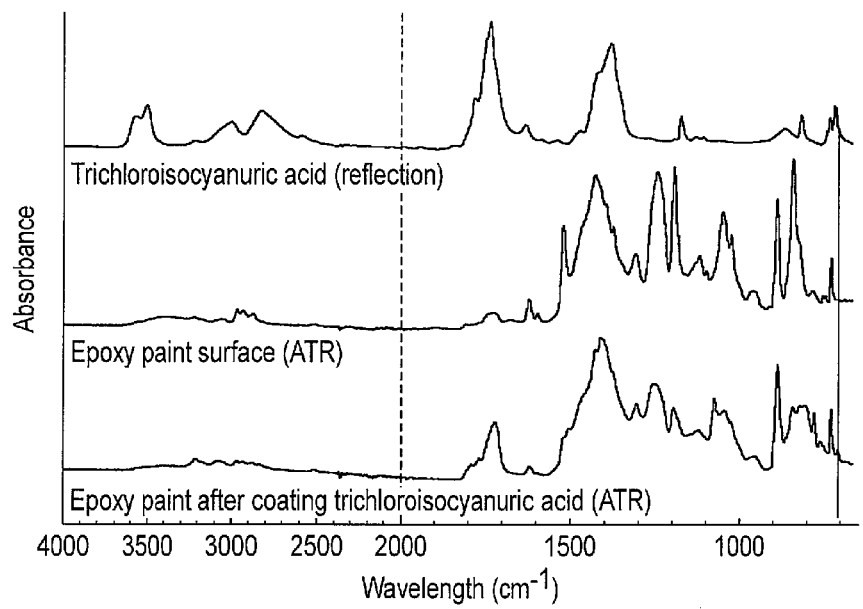
FIG. 3 shows FT-IR charts before and after a reaction between an amine-based curable epoxy paint and trichloroisocyanuric acid.
Figure 4:
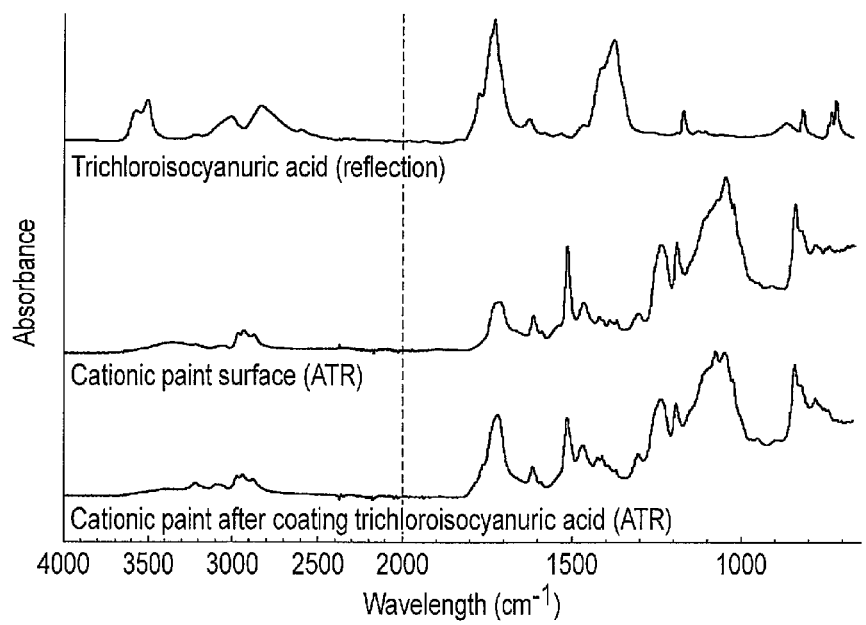
FIG. 4 shows FT-IR charts before and after a reaction between an amine-containing cationic paint and trichloroisocyanuric acid.

The outcome of the above mentioned reaction can be determined by an FT-IR measurement. FIG. 3 shows FT-IR charts before and after reaction between amine-based curable epoxy paint and trichloroisocyanuric acid. FIG. 4 shows FT-IR charts before and after reaction between amine-containing cationic paint and trichloroisocyanuric acid. It is understood from the charts that a peak appears in the vicinity of 1050 cm$^{-1}$ after reaction.

In order to react with a halogen donor-based surface treatment agent, it is preferable to have an R-NH$_2$ structure like the amine-based curable epoxy paint or the amine-containing cationic electrodeposition paint. This is clear from the result of Comparative Example 6.

The halogen donor-based surface treatment agent does not react with materials that do not have an R—NH$_2$ structure such as bisphenol F type epoxy resin or bisphenol A type epoxy resin which is the primary ingredient of the adhesive. However, when an amine-based curing agent or an organic hydrazide-based curing agent is used as the curing agent of an adhesive, the following reaction between the curing agent and trichloroisocyanuric acid is considered to occur, since the curing agent has the R—NH$_2$ structure.

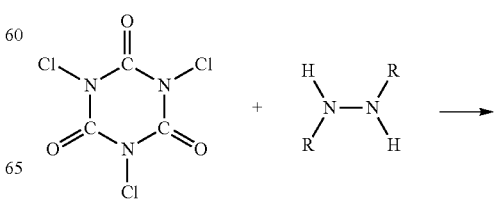

-continued

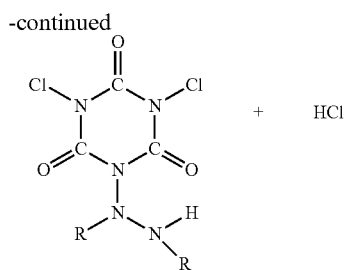 + HCl

Figure 5:
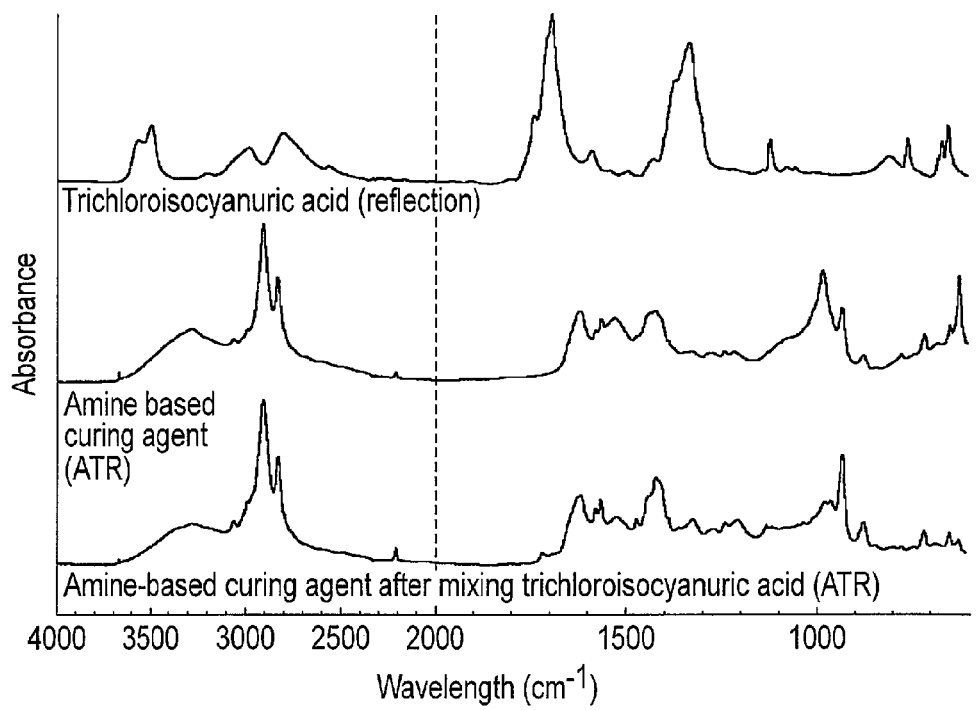
FIG. 5 shows FT-IR charts before and after a reaction between an amine-based curing agent and trichloroisocyanuric acid.
Figure 6:
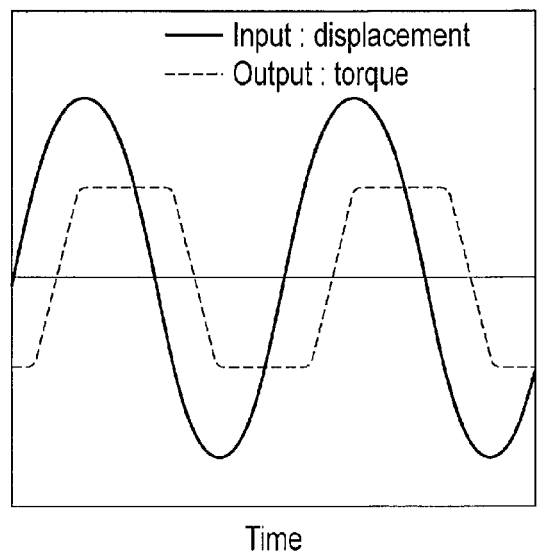
FIG. 6 is a graph showing the relationship between displacement and torque of the stabilizer bar.

The outcome of the above mentioned reaction also can be determined by an FT-IR measurement. FIG. 5 shows FT-IR charts before and after reaction between an amine-based curing agent and trichloroisocyanuric acid. It is also understood from the charts that a peak appears in the vicinity of 1050 $cm^{-1}$ after reaction.

On the other hand, an acid anhydride-based curing agent or a polymercaptan-based curing agent does not have an R—$NH_2$ structure, and thus does not react with trichloroisocyanuric acid.

To summarize, on the steel member side, the paint and trichloroisocyanuric acid react with each other, and moreover, the curing agent in the adhesive and trichloroisocyanuric acid react with each other. On the rubber bush side, the natural rubber and trichloroisocyanuric acid react with each other, and similarly, the curing agent in the adhesive and trichloroisocyanuric acid react with each other. As such, since objects bonded together chemically react with each other, it is possible to achieve strong bonding comparable to that of vulcanization bonding.

The surface of the natural rubber can be roughened after vulcanization molding. Since the adhesive exerts an anchor effect on the fine irregularity of the surface created by roughening, adhesion force can be further enhanced. Therefore, even if the adhesive more or less deteriorates due to the water resistance test, it is capable of exhibiting sufficient adhesion force strong enough to completely make the rubber to be broken.

As mention above, according to embodiments of the present invention, by using a generally applied paint for automobiles of amine-based curable epoxy paint and amine-containing cationic electrodeposition paint and vulcanized natural rubber bush, and by applying surface treatment with a halogen donor such as trichloroisocyanuric acid, which is readily available at a low cost, it is possible to manufacture at a low cost a bush- and bracket-integrated stabilizer bar using an epoxy adhesive which is of low cost and has good adhesiveness, and which is capable of bonding with a curing treatment at low temperature in a short time period. In the present invention, since the members chemically react with each other to form strong bonding, it is possible to achieve strong bonding comparable to that of vulcanization bonding and to achieve manufacturing at a lower cost than the vulcanization bonding.

What is claimed is:

1. A bush- and bracket-integrated stabilizer bar comprising a stabilizer bar, a rubber bush attached to an outer periphery of the stabilizer bar, and a bracket configured to mount the stabilizer bar to a bottom of a vehicle body with the rubber bush intervened,
wherein the stabilizer bar comprises an amine-based curable epoxy paint or an amine-containing cationic paint and a surface treatment layer containing a halogen donor-based surface treatment agent on the paint, in that the rubber bush comprises a surface treatment layer containing a halogen donor-based surface treatment agent on an inner surface thereof, and in that an adhesive layer containing an amine-based or an organic hydrazide-based curing agent and an epoxy resin is formed between the stabilizer bar and the rubber bush with each of the surface treatment layers intervened.

2. The bush- and bracket-integrated stabilizer bar according to claim 1, wherein the bracket comprises an amine-based curable epoxy paint or an amine-containing cationic paint on an inner surface thereof and a surface treatment layer containing a halogen donor-based surface treatment agent on the paint, in that the rubber bush comprises a surface treatment layer containing a halogen donor-based surface treatment agent on an outer surface thereof, and in that an adhesive layer containing an amine-based or an organic hydrazide-based curing agent and an epoxy resin is formed between the bracket and the rubber bush with each of the surface treatment layers intervened.

3. The bush- and bracket-integrated stabilizer bar according to claim 2, wherein the halogen donor-based surface treatment agent contains trichloroisocyanuric acid.

4. The bush- and bracket-integrated stabilizer bar according to claim 2, wherein the surface of the rubber bush, on which the adhesive layer is formed, is roughened.

5. The bush- and bracket-integrated stabilizer bar according to claim 1, wherein the halogen donor-based surface treatment agent contains trichloroisocyanuric acid.

6. The bush- and bracket-integrated stabilizer bar according to claim 1, wherein the surface of the rubber bush, on which the adhesive layer is formed, is roughened.

* * * * *